(12) United States Patent
Li et al.

(10) Patent No.: US 11,965,788 B2
(45) Date of Patent: Apr. 23, 2024

(54) PRESSURE SENSOR AND ELECTRONIC TERMINAL

(71) Applicant: SHENZHEN NEW DEGREE TECHNOLOGY CO., LTD., Guangdong (CN)

(72) Inventors: Hao Li, Guangdong (CN); Tuoxia Huang, Guangdong (CN)

(73) Assignee: SHENZHEN NEW DEGREE TECHNOLOGY CO., LTD., Shenzhen (CN)

(*) Notice: Subject to any disclaimer, the term of this patent is extended or adjusted under 35 U.S.C. 154(b) by 454 days.

(21) Appl. No.: 17/416,433

(22) PCT Filed: Dec. 20, 2018

(86) PCT No.: PCT/CN2018/122313
§ 371 (c)(1),
(2) Date: Jun. 18, 2021

(87) PCT Pub. No.: WO2020/124476
PCT Pub. Date: Jun. 25, 2020

(65) Prior Publication Data
US 2022/0074799 A1 Mar. 10, 2022

(51) Int. Cl.
*G01L 1/22* (2006.01)
*G01L 5/22* (2006.01)

(52) U.S. Cl.
CPC .............. *G01L 1/2262* (2013.01); *G01L 5/22* (2013.01)

(58) Field of Classification Search
CPC .................. G01L 1/2262; G01L 5/22
(Continued)

(56) References Cited

U.S. PATENT DOCUMENTS

| 8,256,123 B2* | 9/2012 | Lee | G06F 3/014 33/1 PT |
| 8,994,528 B2* | 3/2015 | Celik-Butler | G01L 1/18 340/539.22 |

(Continued)

FOREIGN PATENT DOCUMENTS

| CN | 206330693 | 7/2017 |
| CN | 108204870 | 6/2018 |

(Continued)

OTHER PUBLICATIONS

International Search Report for PCT/CN2018/122313 dated Sep. 5, 2019, 5 pages.
(Continued)

*Primary Examiner* — Nathaniel T Woodward
(74) *Attorney, Agent, or Firm* — NIXON & VANDERHYE, P.C.

(57) ABSTRACT

A pressure sensor is disclosed, which includes a substrate attached to an object being tested, a force transmission structure connected to the substrate, and a pressure measuring circuit; the force transmission structure includes a first elastomer and a second elastomer arranged alternately in sequence, the adjacent first elastomer and second elastomer are abutted against each other, and rigidity of the second elastomer is lower than rigidity of the first elastomer; the pressure measuring circuit is provided with at least two resistors, at least one of the resistors is provided at a position of the substrate corresponding to the second elastomer, and the at least one of the resistors is a strain sensing resistor configured to detect deformation of the second elastomer. An electronic terminal is also provided, which includes an object being tested, the pressure sensor, and a pressure sensing detection circuit electrically connected to the strain sensing resistor.

20 Claims, 3 Drawing Sheets

(58) Field of Classification Search
USPC .................................................. 73/862.627
See application file for complete search history.

(56) References Cited

U.S. PATENT DOCUMENTS

| | | | | |
|---|---|---|---|---|
| 10,386,970 | B2* | 8/2019 | Harley | G06F 3/0447 |
| 2008/0093687 | A1* | 4/2008 | Antaki | G06V 40/1306 |
| | | | | 438/51 |
| 2010/0155729 | A1* | 6/2010 | Yang | H05K 1/0265 |
| | | | | 257/E27.113 |
| 2011/0226069 | A1* | 9/2011 | Kim | G01L 1/2293 |
| | | | | 29/25.01 |
| 2018/0306656 | A1 | 10/2018 | Guidetti et al. | |
| 2021/0215554 | A1* | 7/2021 | Araromi | A61B 5/6843 |

FOREIGN PATENT DOCUMENTS

| | | |
|---|---|---|
| CN | 108235748 | 6/2018 |
| CN | 108540119 | 9/2018 |

OTHER PUBLICATIONS

Written Opinion of the ISA for PCT/CN2018/122313 dated Sep. 5, 2019, 3 pages.

* cited by examiner

PRESSURE SENSOR AND ELECTRONIC TERMINAL

CROSS REFERENCE TO RELATED APPLICATIONS

This application is a National Stage of PCT Application No. PCT/CN2018/122313 filed on Dec. 20, 2018, the content of which is incorporated herein by reference thereto.

TECHNICAL FIELD

The present application involves in the field of pressure sensing technologies, and relates to a pressure sensor and an electronic terminal with the pressure sensor.

BACKGROUND

In present industries, there are already some pressure sensors, such as a resistance strain gauge type, a capacitive sensing type, and a piezoelectric ceramic type. All these pressure sensors form the pressure sensors themselves through a complex circuit design and structural design. For example, for the resistance strain gauge type, it is necessary to select strain gauges that meet the requirements of resistance and deviation among many produced strain gauges, and at the same time combine the strain gauges into a certain circuit structure, and connect it to a sensing structure with an adhesive. The strain gauge is provided with small pressure deformation, so the sensing structure needs to be accurately positioned and carefully bonded. The capacitive sensing type requires strictly controlling distances from respective capacitive points to a panel, and obtaining pressure information by distance changes. This approach requires extremely high machining accuracy and assembly accuracy. The piezoelectric ceramic type obtains a transient voltage change through instantaneous impact on the piezoelectric ceramic to obtain a pressure value; its production requires a uniform piezoelectric ceramic piece, and it needs to be mounted on a set structure via a special mounting method. This approach greatly increases the use cost of the pressure sensors, and brings difficulties to the large-scale promotion of the pressure sensors. In particular, these pressure sensors have poor anti-interference with respect to external environments, and the pressure sensors will be affected under conditions such as temperature changes, thereby resulting in inaccurate pressure measurement.

Technical Problem

A purpose of the present application is to provide a pressure sensor and an electronic terminal, so as to solve the technical problems that the existing pressure sensors require accurate positioning, care adhesive bonding, high processing accuracy and assembly accuracy, or have high use cost caused by mounting via special mounting methods.

SUMMARY

An embodiment of the present application provides a pressure sensor, which includes a substrate attached to an object being tested, and a force transmission structure connected to the substrate. The force transmission structure includes a first elastomer and a second elastomer arranged alternately in sequence, the adjacent first elastomer and second elastomer are abutted against each other, and rigidity of the second elastomer is lower than rigidity of the first elastomer. The pressure sensor further includes a pressure measuring circuit provided with at least two resistors, at least one of the resistors is provided at a position of the substrate corresponding to the second elastomer, and the at least one of the resistors is a strain sensing resistor configured to detect deformation of the second elastomer.

An embodiment of the present application provides an electronic terminal, which includes an object being tested, the above-mentioned pressure sensor, and a pressure sensing detection circuit electrically connected to the strain sensing resistor, wherein the substrate is attached to the object being tested.

BENEFICIAL EFFECTS

When the force transmission structure bends and deforms, since the rigidity of the second elastomer is lower than that of the first elastomer, the strain sensing resistor at the second elastomer produces greater deformation than the first elastomer, which improves the signal-to-noise ratio of the output signal generated by the pressure measurement circuit. This pressure sensor is easy to be manufactured and assembled and has a compact structure, and can realize the pressure identification and detection and is provided with high sensitivity, thereby avoiding the situations that the existing pressure sensors require an extremely rigid assembly method, is provided with low pressure detection accuracy and high production cost.

The substrate is attached to the object being tested to form the electronic terminal provided with a touch position detection function and a touch pressure detection function. When the object being tested is pressed, the position information of the touch will be detected; at the same time, the pressing pressure is transmitted to the force transmission structure through the object being tested, the resistor will deform with the deformation of the object being tested, and the pressure sensor will convert the deformation into the electrical signal to obtain the pressure value via the pressure sensing detection circuit. On the basis of the information obtained by the object being tested, the function to accurately identify the touch pressure is added, the user experience is improved, and the functions and applications of the product are expanded. The electronic terminal with the pressure sensor does not require high-precision installation, has a simple structure and low cost, is convenient to be assembled and has a wide range of applications.

DESCRIPTION OF THE DRAWINGS

In order to illustrate the technical solutions in the embodiments of the present application more comprehensively, the drawings needed to be used in the description for the embodiments or the prior art will be briefly introduced below. Obviously, the drawings in the following description are merely some embodiments of the present application, and other drawings may be obtained by those of ordinary skill in the art based on these drawings without creative labor.

EMBODIMENTS OF THE PRESENT APPLICATION

In order to make the technical problem, technical solutions, and beneficial effects to be solved by the present application more comprehensible, the present application will be further described in detail below with reference to the accompanying figures and embodiments. It should be understood that the specific embodiments described herein are only used to explain the present application, but not to limit the present application.

In the description of the embodiments of the present application, it should be understood that orientations or positional relations indicated by terms, such as "length", "width", "upper", "lower", "front", "rear", "left", "right", "vertical", "horizontal", "top", "bottom", "inner", "outer" and the like, are based on the orientations or positional relations as shown in the figures, which are only to facilitate description of the embodiments of the present application and simplification of the description, but not to indicate or imply that a specified device or element must be provided with a specific orientation, be constructed and operated in a specific orientation. Therefore, the orientations or positional relations cannot be understood as a limitation to the embodiments of the present application.

In addition, the terms "first" and "second" are only used for descriptive purposes, and cannot be understood as an indication or implication of relative importance or an implicit indication of the number of an indicated technical feature. As such, the features defined with "first" and "second" may explicitly or implicitly include one or more of these features. In the description of the present application, "plurality" means two or more, unless otherwise specifically defined.

In the embodiments of the present application, unless otherwise clearly specified and defined, the terms "mounting", "connection", "engagement", "fixing" and the like should be understood in a broad sense. For example, the connection may be fixed connection or detachable connection, or one-piece; the connection may be mechanical connection or electrical connection; the connection may be direct connection or indirect connection through an intermediate medium, or may be internal communication of two elements or interaction relationship between two elements. For those of ordinary skill in the art, the specific meanings of the above-mentioned terms in the embodiments of the present application can be understood according to specific conditions.

Please refer to FIGS. 1 to 10 together, an embodiment of the present application provides a pressure sensor. The pressure sensor includes a substrate 10 attached to an object being tested, and a force transmission structure 20 connected to the substrate 10. The force transmission structure 20 includes a first elastomer 21 and a second elastomer 22 arranged alternately in sequence. The first elastomer 21 is abutted with adjacent one second elastomer 22, and the second elastomer 22 is provided with lower rigidity than that of the first elastomer 21. The pressure sensor also includes a pressure measurement circuit, the pressure measurement circuit is provided with at least two resistors, and at least one resistor is arranged on a position of the substrate 10 corresponding to the second elastomer 22, and the at least one resistor is a strain sensing resistor R1 configured to detect deformation of the second elastomer 22.

When the force transmission structure 20 is bent and deformed, since the rigidity of the second elastomer 22 is lower than the rigidity of the first elastomer 21, the strain sensing resistor R1 at the second elastomer 22 undergoes greater deformation than the first elastomer 21, therefore a signal-to-noise ratio of an output signal produced by the pressure measurement circuit is improved. This pressure sensor is easy to manufacture and assemble and has a compact structure, and can realize pressure identification, pressure detection and high sensitivity, therefore which can avoid situations of extremely rigid assembly methods, low pressure detection accuracy and high production cost in the existing pressure sensors.

The substrate 10 is placed against the object being tested to form an electronic terminal provided with a touch position detection function and a touch pressure detection function. When the object being tested is pressed, position information about touch will be detected; at the same time, the touch pressure is transmitted to the force transmission structure 20 through the object being tested, the resistor will deform with the deformation of the object being tested, the pressure sensor transforms the deformation into an electrical signal, and a pressure value is obtained through a pressure sensing detection circuit. On the basis of the information obtained by the object being tested, the ability to accurately identify the touch pressure is added, the user experience is improved, and functions and applications of the product are expanded. The electronic terminal provided with the pressure sensor does not require high-precision assembling requirements, has a simple structure and low cost, and is convenient to assemble and has a wide range of applications.

The substrate 10 is a PET film (high temperature resistant polyester film), a PI film (polyimide film), a flexible circuit board, or other applicable flexible material. The above-mentioned substrate 10 can be used to support the resistors.

The first elastomer 21 and the second elastomer 22 are two materials with different mechanical properties, and the rigidity of the second elastomer 22 is lower than that of the first elastomer 21. When the force transmission structure 20 is subjected to the same pressure, the deformation of the second elastomer 22 is greater than that of the first elastomer 21, so that the strain sensing resistor corresponding to the second elastomer 22 may obtain a larger resistance value change, the pressure sensor converts the deformation into an electrical signal, and the pressure value is obtained via the pressure sensing detection circuit.

Further, as a specific implementation of the pressure sensor provided by the present application, the force transmission structure 20 and the substrate 10 are connected through a first adhesive 31. This structure is easy to be assembled, so that the respective first elastomer 21 and second elastomer 22 are both connected to the substrate 10, and adjacent one first elastomer 21 and one second elastomer 22 are abutted with each other. The first adhesive 31 may be double-sided adhesive tape, VHB acrylic foam glue, AB glue, epoxy resin or other similar material.

Figure 3:
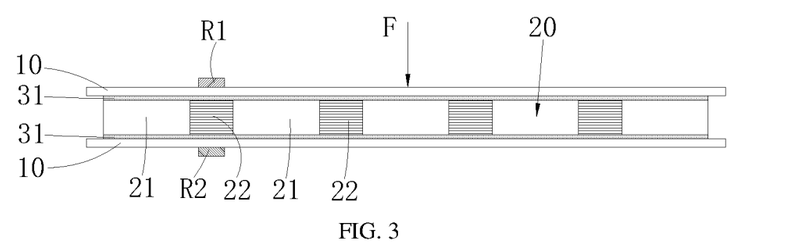
FIG. 3 is a cross-sectional view of a pressure sensor provided by an embodiment of the present application.
Figure 4:
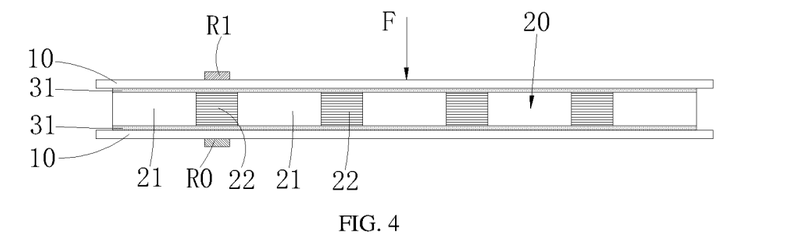
FIG. 4 is a cross-sectional view of a pressure sensor provided by another embodiment of the present application.

Further, referring to FIGS. 3 and 4, as a specific implementation of the pressure sensor provided by the present application, an upper surface and a lower surface of the force transmission structure 20 are respectively connected with a layer of the substrate 10. This structure is easy to be assembled, so that the first elastomer 21 and the second elastomer 22 are reliably connected to form the force transmission structure 20 as a whole.

Further, referring to FIG. 3, as a specific implementation of the pressure sensor provided by the present application, positions of the two substrates 10 corresponding to the same second elastomer 22 are respectively provided with the strain sensing resistors R1 and R2. The strain sensing resistors R1 and R2 are connected in series or in parallel. This structure is easy to be assembled. When the upper substrate 10 is pressed down, the force transmission structure 20 bends and deforms, the strain sensing resistor R1 shows a positive change, the strain sensing resistor R2 shows a negative change, the pressure sensor converts the deformation into the electrical signal, and the pressure value is obtained via the pressure sensing detection circuit.

Alternatively, referring to FIG. 4, a position of the two layers of substrates 10 corresponding to the second elastomer 22 is provided with a strain sensing resistor R1, a reference resistor R0 may be arranged freely, and the strain sensing resistor R1 and the reference resistor R0 are connected in series or in parallel. This structure is easy to be assembled. When the upper substrate 10 is pressed down, the force transmission structure 20 bends and deforms, the strain sensing resistor R1 changes and the reference resistor R0 remains unchanged, the pressure sensor converts the deformation into the electrical signal, and the pressure value is obtained via the pressure sensing detection circuit. Alternatively, referring to FIG. 5, positions of the two layers of substrates 10 corresponding to the same second elastomer 22 are provided with two resistors respectively, and at least one of the resistors is a strain sensing resistor for detecting the deformation of the second elastomer 22, so as to form a variety of bridge circuits. If the reference resistor R0 is provided, the reference resistor R0 may be arranged freely. This structure is easy to be assembled. When the upper substrate 10 is pressed down, the force transmission structure 20 bends and deforms, the strain sensing resistor of the upper substrate 10 shows a positive change, and the strain sensing resistor of the lower substrate 10 shows a negative change. If the reference resistor R0 is provided, the reference resistor R0 remains unchanged. The pressure sensor converts the deformation into the electrical signal, and the pressure value is obtained via the pressure sensing detection circuit.

Figure 7:
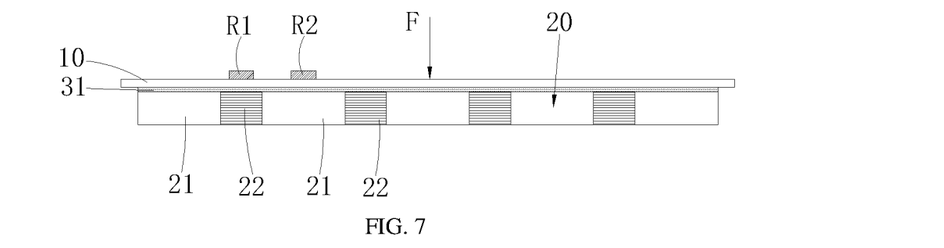
FIG. 7 is a cross-sectional view of a pressure sensor provided by yet another embodiment of the present application.

Further, referring to FIG. 7, as a specific implementation of the pressure sensor provided by the present application, one surface of the force transmission structure 20 is provided with one layer of substrate 10, and positions of the substrate 10 corresponding to the adjacent first elastomer 21 and second elastomer 22 are respectively provided with strain sensing resistors R1 and R2. The strain sensing resistor R1 is configured to detect the deformation of the second elastomer 22. The strain sensing resistor R2 is configured to detect the deformation of the first elastomer 21. The strain sensing resistors R1 and R2 may be connected in series or in parallel. This structure is easy to be assembled. When this substrate 10 is pressed down, the force transmission structure 20 bends and deforms, the strain sensing resistor R1 changes greatly, and the strain sensing resistor R2 changes little. The pressure sensor converts the deformation into the electrical signal, and the pressure value is obtained via the pressure sensing detection circuit.

Figure 8:
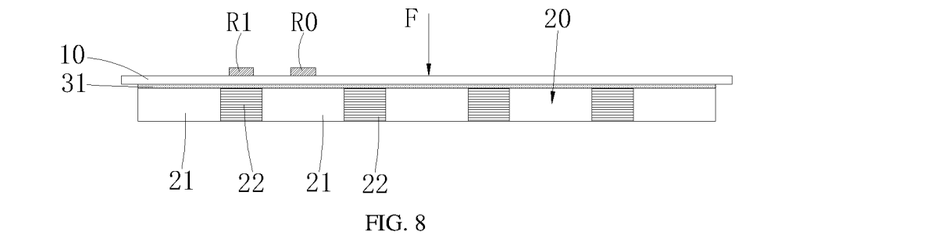
FIG. 8 is a cross-sectional view of a pressure sensor provided by yet another embodiment of the present application.

Alternatively, referring to FIG. 8, one surface of the force transmission structure 20 is provided with one layer of substrate 10, and a position of the substrate 10 corresponding to the second elastomer 22 is provided with the strain sensing resistor R1. The reference resistor R0 is arranged freely, and the strain sensing resistor R1 and the reference resistor R0 may be connected in series or in parallel. This structure is easy to be assembled. When the substrate 10 is pressed down, the force transmission structure 20 bends and deforms, the strain sensing resistor R1 changes, and the reference resistor R0 remains unchanged, the pressure sensor converts the deformation into the electrical signal, and the pressure value is obtained via the pressure sensing detection circuit.

Figure 9:
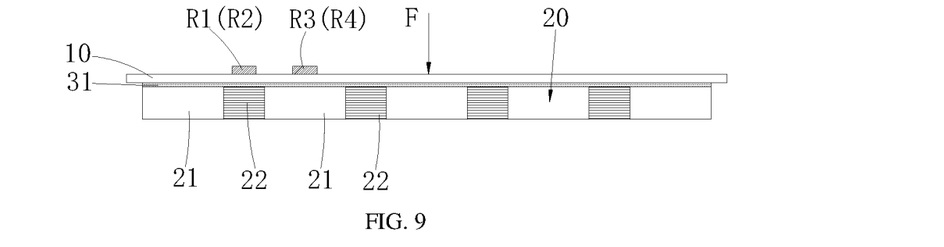
FIG. 9 is a cross-sectional view of a pressure sensor provided by yet another embodiment of the present application.

Alternatively, referring to FIG. 9, one surface of the force transmission structure 20 is provided with one layer of substrate 10, and positions of the substrate 10 respectively corresponding to the first elastomer 21 and the second elastomer 22 are provided with two resistors, and at least one resistor is a strain sensing resistor configured to detect the deformation of the second elastomer 22, so as to form a variety of bridge circuits. If the reference resistor R0 is provided, the reference resistor R0 may be arranged freely. This structure is easy to be assembled. When the substrate 10 is pressed down, the force transmission structure 20 bends and deforms, the strain sensing resistor positioned at the first elastomer 21 changes greatly, and the strain sensing resistor positioned at the second elastomer 22 changes little. If the reference resistor R0 is provided, the reference resistor R0 remains unchanged. The pressure sensor converts the deformation into the electrical signal, and the pressure value is obtained via the pressure sensing detection circuit.

Figure 5:
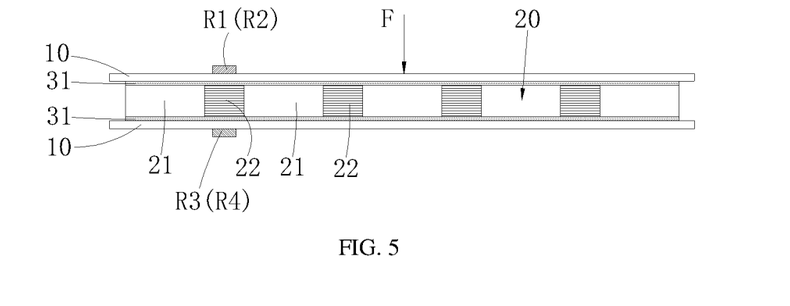
FIG. 5 is a cross-sectional view of a pressure sensor provided by yet another embodiment of the present application.
Figure 6:
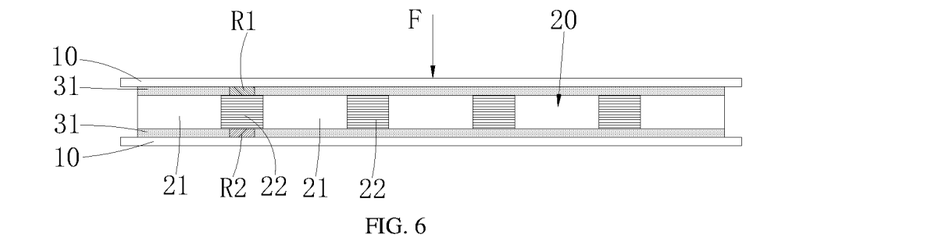
FIG. 6 is a cross-sectional view of a pressure sensor provided by yet another embodiment of the present application.
Figure 10:
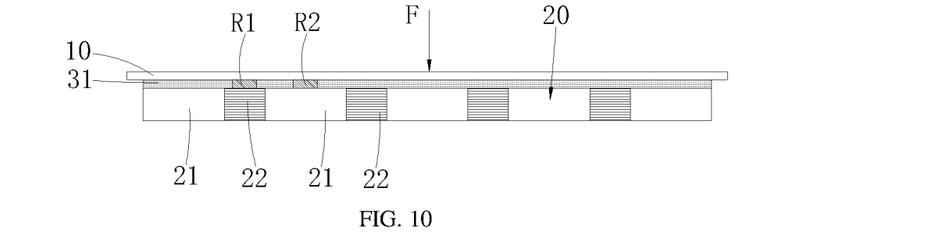
FIG. 10 is a cross-sectional view of a pressure sensor provided by yet another embodiment of the present application.

Further, as a specific implementation of the pressure sensor provided by the present application, the strain sensing resistor is provided on an outer surface (as shown in FIGS. 3 to 5, and FIGS. 7 to 9) or an inner surface (as shown in FIGS. 6 and 10) of the substrate 10 as. Both structures can realize the pressure sensing, which may be selected according to specific needs. Here, the inner surface of the substrate 10 refers to a surface of the substrate 10 close to the force transmission structure 20, and the outer surface of the substrate 10 refers to a surface of the substrate 10 facing away from the force transmission structure 20, and the inner surface and the outer surface are arranged opposite to each other.

Figure 1:
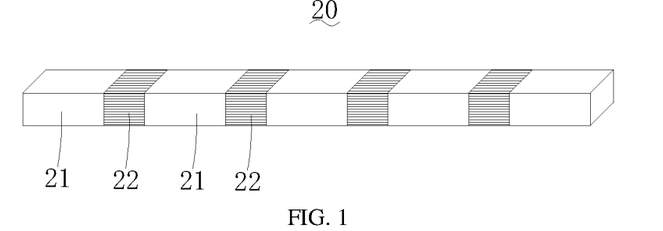
FIG. 1 is a three-dimensional assembly diagram of a force transmission structure applied in a pressure sensor according to an embodiment of the present application.
Figure 2:
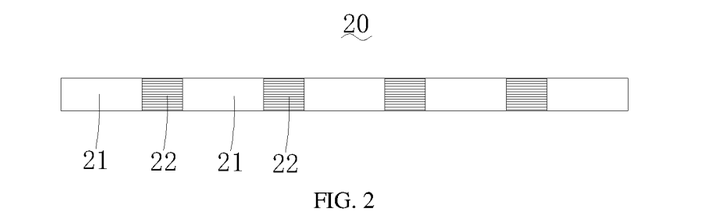
FIG. 2 is a front view of the force transmission structure of FIG. 1.

Further, please refer to FIGS. 1 and 2, as a specific implementation of the pressure sensor provided by the present application, the first elastomer 21 and the second elastomer 22 both have a shape of rectangular parallelepiped, and one side of the first elastomer 21 is abutted with one side of adjacent one second elastomer 22. This structure is easy to be assembled, is a compact structure, and takes up less space.

Further, as a specific implementation of the pressure sensor provided by the present application, the length of the first elastomer 21 is greater than, equal to or less than the length of the second elastomer 22. The above-mentioned structure facilitates the alignment and assembly of the strain sensing resistors at predetermined positions, which may be selected as required.

Figure 11:
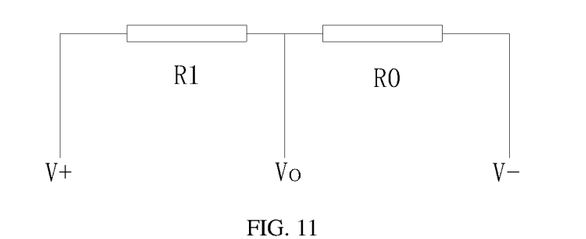
FIG. 11 is a schematic diagram in which a pressure measurement circuit in the pressure sensor provided by an embodiment of the present application is a voltage divider circuit.

Further, please refer to FIGS. 4 and 11 together, as a specific implementation of the pressure sensor provided by the present application, the pressure measurement circuit is provided with two resistors, and the pressure measurement circuit is a voltage divider circuit consisted of one strain sensing resistor R1 and one reference resistor R0 connected in series.

Through using a constant voltage source, an input voltage Ui is applied at both ends V+ and V− to detect potential at Vo or measure an output voltage Uo between the Vo and ground. An input and output voltage equation is as follows:

$$U_0 = R_1 U_i / (R_1 + R_0).$$

When the strain sensing resistor R1 deforms, its electrical characteristics change, and the pressure measurement circuit obtains the output voltage Uo. A corresponding electrical signal output is obtained through the pressure sensing detection circuit 50 to realize the pressure identification and detection. When the reference resistor R0 is provided, the reference resistor R0 may be arranged at any position.

Understandably, referring to FIGS. 3 and 11, the pressure measurement circuit is provided with two resistors, and the pressure measurement circuit is a voltage divider circuit formed by two strain sensing resistors R1 and R2 connected in series. This solution can also obtain the corresponding electrical signal output through the pressure sensing detection circuit 50 to realize the pressure identification and detection.

Figure 12:
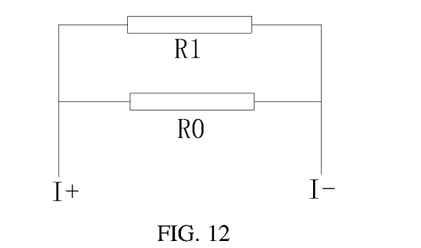
FIG. 12 is a schematic diagram in which a pressure measurement circuit in the pressure sensor provided by an embodiment of the present application is a shunt circuit.

Further, please refer to FIGS. 4 and 12, as a specific implementation of the pressure sensor provided by the present application, the pressure measurement circuit is provided with two resistors, and the pressure measurement circuit is a shunt circuit formed by one strain sensing resistor R1 and one reference resistor R0 connected in parallel.

Through using a constant current source, an input current I is added at both ends I+ and I−, and an output current I1 on the branch R1 is measured. An input and output current equation is as follows:

$$I_1 = R_0 I / (R_1 + R_0).$$

When the strain sensing resistor R1 deforms, its electrical characteristics change, and the pressure measurement circuit obtains the output current I1. The corresponding electrical signal output is obtained through the pressure sensing detection circuit 50 to realize the pressure identification and detection. When the reference resistor R0 is provided, the reference resistor R0 may be arranged at any position.

Understandably, referring to FIGS. 3 and 12, the pressure measurement circuit is provided with two resistors, and the pressure measurement circuit may also be a shunt circuit formed by two strain sensing resistors R1 and R2 connected in parallel. This solution can also obtain the corresponding electrical signal output through the pressure sensing detection circuit 50 to realize the pressure identification and detection.

Figure 13:
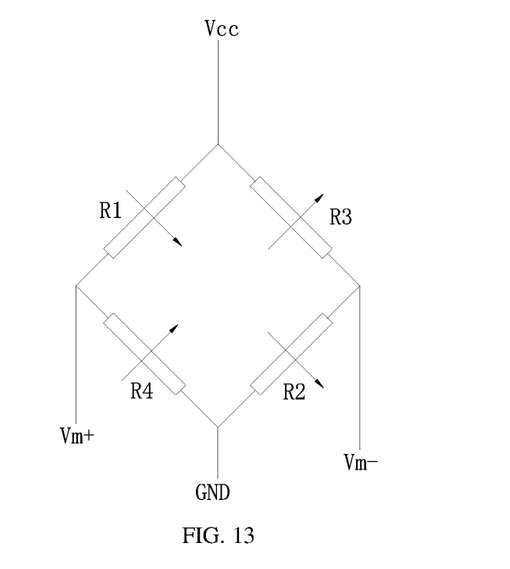
FIG. 13 is a schematic diagram in which a pressure measurement circuit in the pressure sensor provided by an embodiment of the present application is a Wheatstone bridge.

Further, please refer to FIGS. 5 and 13, as a specific implementation of the pressure sensor provided by the present application, the pressure measurement circuit is provided with four resistors, and the pressure measurement circuit is a full bridge formed by four strain sensing resistors R1, R2, R3, and R4 electrically connected. Among them, the strain sensing resistors R1 and R2 are opposite bridge arms, and the strain sensing resistors R3 and R4 are opposite bridge arms. Two resistors are respectively provided at positions of the two layers of substrates 10 corresponding to the same second elastomer 22. When the upper substrate 10 is pressed, the force transmission structure 20 bends and deforms, the strain sensing resistors R1 and R2 corresponding to the upper substrate 10 produce larger positive deformation, and the strain sensing resistors R3 and R4 corresponding to the lower substrate 10 produce larger negative deformation, at this time the bridge circuit will generate a voltage difference as an output signal.

In the full bridge composed of the strain sensing resistors R1 and R2 and the strain sensing resistors R3 and R4, when the voltage Ui is input, the output voltage Uo is obtained at both ends Vm+ and Vm−, and the input and output voltage equation is as follows:

$$U_0 = (R_1 R_2 - R_3 R_4) U_i / [(R_1 + R_4)(R_2 + R_3)]$$

Since the resistance value of the strain sensing resistor changes according to the deformation, the two sets of strain sensing resistors must have different deformations in order to obtain different changes of the two sets of resistance values. The pressure sensor is abutted on the back of the object being tested, when the object being tested is pressed, the strain sensing resistors will deform with the deformation of the object being tested. When the object being tested is pressed, the strain sensing resistors change, and the output voltage Uo is further obtained as the output signal.

Further, please refer to FIG. 9 and FIG. 13, as a specific implementation of the pressure sensor provided by the present application, the pressure measurement circuit is provided with four resistors, and the pressure measurement circuit is a full bridge composed of four strain sensing resistors R1, R2, R3, and R4 electrically connected. Among them, the strain sensing resistors R1 and R2 are opposite bridge arms, and the strain sensing resistors R3 and R4 are opposite bridge arms. One surface of the force transmission structure 20 is provided with one layer of substrate 10, and positions of the substrate 10 corresponding to the first elastomer 21 and the second elastomer 22 are provided with two resistors respectively. When the substrate 10 is pressed, the force transmission structure 20 bends and deforms, and the strain sensing resistors R1 and R2 corresponding to the second elastomer 22 undergo larger deformation, while the strain sensing resistors R3 and R4 corresponding to the first elastomer 21 undergo smaller deformation or no deformation, at this time the bridge circuit will generate a voltage difference as the output signal.

Understandably, the pressure measurement circuit is provided with four resistors, and the pressure measurement circuit is a Wheatstone bridge formed by one strain sensing resistor and three reference resistors R0 electrically connected; alternatively, the pressure measurement circuit is provided with four resistors, and the pressure measurement circuit is a half bridge formed by two strain sensing resistors and two reference resistors R0 electrically connected. Alternatively, the pressure measurement circuit is provided with four resistors, and the pressure measurement circuit is a bridge circuit formed by three strain sensing resistors and one reference resistor R0 electrically connected. All of the above solutions can realize the pressure sensing through generation of a measurement signal by the strain sensing resistors as the object being tested bends and deforms when pressure is applied to the object being tested.

Furthermore, the strain sensing resistor is sensitive to environmental factors such as temperature, humidity, vibration, electromagnetic interference, etc., and a change in the environmental factors will lead to a change in the resistance value. The strain sensing resistors R1 and R2 that need to be changed are placed on the second elastomer 22, and the strain sensing resistors R3 and R4 that are unchanged or less changing are placed on or near the first elastomer 21. The second elastomer 22 generates strain amplification, and the four strain sensing resistors of the bridge circuit are placed at near positions to generate different deformations respectively to obtain the electrical signal. At the same time, this approach allows the two sets of strain sensing resistors in the bridge to be located very close. At near positions, the changes in the environmental factors are also similar, and the two sets of strain sensing resistors will be affected by the environmental factors at the same time, thus the resistance values will become larger or smaller at the same time without affecting the change of the voltage difference. Therefore, this design not only ensures that the two sets of strain sensing resistors in the bridge have different deformations, but also ensures that the change in the environmental factors such as temperature, humidity, vibration, electromagnetic interference and the like has a very small impact on the two sets of strain sensing resistors, thereby solving the problem of interference from the environmental factors.

Further, as a specific implementation of the pressure sensor provided by the present application, the outer surface of the substrate 10 is provided with a second adhesive for bonding with the object being tested. This structure facilitates the connection of the pressure sensor to the object being tested. The second adhesive may be double-sided adhesive tape, VHB acrylic polystyrene foam, AB adhesive, epoxy resin or other similar material.

Please refer to FIGS. 3 to 10, an electronic terminal provided by an embodiment of the present application includes an object being tested, the pressure sensor of any of the above embodiments, and a pressure sensing detection circuit electrically connected to a strain sensing resistor, where the substrate 10 is attached to the object being tested.

When the force transmission structure 20 is bent and deformed, since the rigidity of the second elastomer 22 is lower than the rigidity of the first elastomer 21, the strain sensing resistor R1 at the second elastomer 22 undergoes greater deformation than the first elastomer 21, thereby improving the signal-to-noise ratio of the output signal produced by the pressure measurement circuit. The pressure sensor is easy to be manufactured and assembled and has a compact structure, can realize the pressure identification and detection and be provided with high sensitivity, thereby avoiding the situations that the existing pressure sensors require an extremely rigid assembly method and are provided with low pressure detection accuracy and high production cost.

The substrate 10 is attached to the object being tested to form the electronic terminal provided with a touch position detection function and a touch pressure detection function. When the object being tested is pressed, the position information about the touch will be detected; at the same time, the touch pressure is transmitted to the force transmission structure 20 through the object being tested, the resistor will deform with the deformation of the object being tested, the pressure sensor will convert the deformation into an electrical signal, and the pressure value is obtained via the pressure sensing detection circuit. On the basis of the information obtained by the object being tested, the function of accurately identifying the touch pressure is added, the user experience is improved, and the functions and applications of the product are expanded. The electronic terminal with the pressure sensor does not require high-precision installation requirements and has a simple structure and low cost, which is convenient for installation and has a wide range of applications.

The pressure sensing detection circuit analyzes and processes the electrical signal from the pressure sensor and then transmits it to a main controller of the electronic terminal together with touch position information detected by the object being tested. As such, the precise pressure of the touch can be obtained while identifying the touch position.

The pressure sensing detection circuit is configured to detect the electrical signal obtained by the pressure sensor, and configured to process and analyze the electrical signal. The pressure sensor is connected to the pressure sensing detection circuit through a connection wire, of course, the connection wire only describes a combination manner of the pressure sensor and the pressure sensing detection circuit. As other embodiments, the pressure sensor may also be directly or indirectly electrically connected to the detection circuit in other ways.

The pressure sensing detection circuit may be used as a control center, which receives control information transmitted by the pressure sensor, and then controls the electronic terminal. The pressure sensing detection circuit is usually described as a combination of hardware and software provided with multiple processing methods. The hardware and software are configured to communicate the control information input by the pressure sensor with a system associated with a customer through feedback and perform additional associated tasks or functions.

The pressure sensing detection circuit may be implemented as a general-purpose processor, a content addressable memory, a digital signal processor, a digital-to-analog switch, a programmable logic device, a discrete hardware assembly or other combinations; at the same time, algorithm and software information related to the pressure touch screen/pressure sensing system is embedded in its interior.

The hardware and software in the pressure sensing detection circuit are configured to perform a variety of functions, technologies, feedback, and processing tasks associated with the client system.

Further, as a specific implementation of the pressure sensor provided by the present application, the object being tested is a panel or a frame. The pressure sensing function of the panel or frame is realized.

The panel may be a touch screen, display or other electronic terminal with a rigid structure. By connecting the pressure sensor with the panel, it is possible to accurately identify the touch pressure while accurately identifying the touch position, which expands the application space for the electronic terminal in product applications, human-computer interaction, and consumer experience. The user can directly obtain a precise pressure level and quantity by touching the touch screen, display or electronic terminal. After calibration, the accurate pressure value of pressing can be obtained.

Specifically, the panel may be a glass plate having a thickness of 1.1 mm, and the glass plate itself is designed with the function of a touch screen; alternatively, the panel may be an LCD liquid crystal display or an OLED display having a thickness of 1.6 mm; alternatively, the panel may be an electronic component provided with a touch function and a display function.

The above description only describes preferred embodiments of the present application, which are not intended to limit the present application. Any modification, equivalent replacement and improvement etc. made within the spirit and principle of the present application shall be included within the protection scope of the present application.

What is claimed is:

1. A pressure sensor, comprising:
an upper substrate attached to an object being tested and a force transmission structure connected to the upper substrate, the force transmission structure comprising a first elastomer and a second elastomer arranged alternately in sequence, wherein the first elastomer and second elastomer are abutted against each other, and rigidity of the second elastomer is lower than rigidity of the first elastomer; and
a pressure measuring circuit provided with at least two resistors, at least one of the resistors provided at a position of the upper substrate corresponding to the second elastomer, and the at least one of the resistors is a strain sensing resistor configured to detect deformation of the second elastomer.

2. The pressure sensor of claim 1, wherein the force transmission structure and the upper substrate are connected via a first adhesive.

3. The pressure sensor of claim 2, wherein an outer surface of the upper substrate is provided with a second adhesive for bonding with the object being tested.

4. The pressure sensor of claim 1, further comprising a lower substrate, wherein the upper substrate and the low substrate are respectively connected to an upper surface and a lower surface of the force transmission structure.

5. The pressure sensor of claim 4, wherein positions of the upper substrate and the lower substrate corresponding to the same second elastomer are provided with one strain sensing resistor respectively; or
positions of the upper substrate and the lower substrate corresponding to the same second elastomer are provided with one strain sensing resistor and one reference resistor respectively.

6. The pressure sensor of claim 1, wherein:
one surface of the force transmission structure is provided with the upper substrate, and positions of the upper substrate corresponding to the first elastomer and second elastomer are provided with two strain sensing resistors; or
one surface of the force transmission structure is provided with the upper substrate, and positions of the upper substrate corresponding to the first elastomer and second elastomer are provided with one reference resistor and one strain sensing resistor respectively.

7. The pressure sensor of claim 1, wherein the strain sensing resistor is provided on an outer surface or an inner surface of the upper substrate.

8. The pressure sensor of claim 1, wherein the first elastomer and the second elastomer both have a shape of rectangular parallelepiped, and a side surface of the first elastomer is abutted against a side surface of the second elastomer.

9. The pressure sensor of claim 1, wherein
the length of the first elastomer is greater than the length of the second elastomer;
or the length of the first elastomer is smaller than the length of the second elastomer.

10. The pressure sensor of claim 1, wherein
the pressure measurement circuit is provided with two resistors, and the pressure measurement circuit is a voltage divider circuit formed by one strain sensing resistor and one reference resistor connected in series; or
the pressure measurement circuit is provided with two resistors, and the pressure measurement circuit is a voltage divider circuit formed by two strain sensing resistors connected in series;
the pressure measurement circuit is provided with two resistors, and the pressure measurement circuit is a shunt circuit formed by one strain sensing resistor and one reference resistor connected in parallel; or
the pressure measurement circuit is provided with two resistors, and the pressure measurement circuit is a shunt circuit formed by two strain sensing resistors connected in parallel;
the pressure measurement circuit is provided with four resistors, and the pressure measurement circuit is a Wheatstone bridge formed by one strain sensing resistor and three reference resistors electrically connected; or
the pressure measurement circuit is provided with four resistors, and the pressure measurement circuit is a half bridge formed by two strain sensing resistors and two reference resistors electrically connected; or
the pressure measurement circuit is provided with four resistors, and the pressure measurement circuit is a full bridge formed by four strain sensing resistors electrically connected; or
the pressure measurement circuit is provided with four resistors, and the pressure measurement circuit is a bridge circuit formed by three strain sensing resistors and one reference resistor electrically connected.

11. An electronic terminal, comprising an object being tested, a pressure sensor, and a pressure sensing detection circuit;
wherein the pressure sensor comprises:
an upper substrate attached to the object being tested and a force transmission structure connected to the upper substrate, the force transmission structure comprises a first elastomer and a second elastomer arranged alternately in sequence, wherein the first elastomer and second elastomer are abutted against each other, and rigidity of the second elastomer is lower than rigidity of the first elastomer; and
a pressure measuring circuit provided with at least two resistors, at least one of the resistors is provided at a position of the upper substrate corresponding to the second elastomer, and the at least one of the resistors is a strain sensing resistor configured to detect deformation of the second elastomer;
wherein the pressure sensing detection circuit is electrically connected to the strain sensing resistor.

12. The electronic terminal of claim 11, wherein the object being tested is a panel or a frame.

13. The electronic terminal of claim 12, wherein an outer surface of the upper substrate is provided with a second adhesive for bonding with the object being tested.

14. The electronic terminal of claim 11, wherein the force transmission structure and the upper substrate are connected via a first adhesive.

15. The electronic terminal of claim 11, wherein the pressure sensor further comprises a lower substrate, the upper substrate and the lower substrate are respectively connected to an upper surface and a lower surface of the force transmission structure.

16. The electronic terminal of claim 14, wherein
positions of the upper substrate and the lower substrate corresponding to the same second elastomer are provided with one strain sensing resistor respectively; or
positions of the upper substrate and the lower substrate corresponding to the same second elastomer are provided with one strain sensing resistor and one reference resistor respectively.

17. The electronic terminal of claim 11, wherein
one surface of the force transmission structure is provided with the upper substrate, and positions of the upper substrate corresponding to the first elastomer and second elastomer are provided with two strain sensing resistors; or
one surface of the force transmission structure is provided with the upper substrate, and positions of the upper substrate corresponding to the first elastomer and second elastomer are provided with one reference resistor and one strain sensing resistor respectively.

18. The electronic terminal of claim 11, wherein the strain sensing resistor is provided on an outer surface or an inner surface of the upper substrate.

19. The electronic terminal of claim 11, wherein
the length of the first elastomer is greater than the length of the second elastomer;
or
the length of the first elastomer is smaller than the length of the second elastomer.

20. The electronic terminal of claim 11, wherein
the pressure measurement circuit is provided with two resistors, and the pressure measurement circuit is a voltage divider circuit formed by one strain sensing resistor and one reference resistor connected in series; or
the pressure measurement circuit is provided with two resistors, and the pressure measurement circuit is a voltage divider circuit formed by two strain sensing resistors connected in series;
the pressure measurement circuit is provided with two resistors, and the pressure measurement circuit is a shunt circuit formed by one strain sensing resistor and one reference resistor connected in parallel; or
the pressure measurement circuit is provided with two resistors, and the pressure measurement circuit is a shunt circuit formed by two strain sensing resistors connected in parallel;
the pressure measurement circuit is provided with four resistors, and the pressure measurement circuit is a Wheatstone bridge formed by one strain sensing resistor and three reference resistors electrically connected; or
the pressure measurement circuit is provided with four resistors, and the pressure measurement circuit is a half bridge formed by two strain sensing resistors and two reference resistors electrically connected; or
the pressure measurement circuit is provided with four resistors, and the pressure measurement circuit is a full bridge formed by four strain sensing resistors electrically connected; or
the pressure measurement circuit is provided with four resistors, and the pressure measurement circuit is a bridge circuit formed by three strain sensing resistors and one reference resistor electrically connected.

* * * * *